United States Patent [19]

Balordi

[11] Patent Number: 5,614,661
[45] Date of Patent: Mar. 25, 1997

[54] APPARATUS AND METHOD FOR TESTING CONTAINERS

[75] Inventor: Romano Balordi, Millers, Md.

[73] Assignee: Sweetheart Cup Company Inc., Owings Mills, Md.

[21] Appl. No.: 591,945

[22] Filed: Jan. 23, 1996

Related U.S. Application Data

[63] Continuation of Ser. No. 309,588, Sep. 21, 1994, abandoned.

[51] Int. Cl.$^6$ .................................................. G01M 3/02
[52] U.S. Cl. ............................ 73/49.3; 73/41; 493/37; 493/105
[58] Field of Search ........................... 73/41, 45, 45.1, 73/45.2, 49.2, 49.3; 493/37, 105, 106

[56] References Cited

U.S. PATENT DOCUMENTS

| | | | |
|---|---|---|---|
| 3,039,294 | 6/1962 | Inman | 73/45.1 |
| 3,307,390 | 3/1967 | Behrens et al. | 73/45.2 |
| 3,351,388 | 11/1967 | Frank | 302/2 |
| 3,369,392 | 2/1968 | Christensson | 73/49.2 |
| 3,389,811 | 6/1968 | Frank | 214/49.2 |
| 3,461,716 | 8/1969 | Thomson | 73/45.1 |
| 3,547,012 | 12/1970 | Amaberg et al. | 93/36.5 |
| 3,683,677 | 8/1972 | Harris | 73/49.2 |
| 3,762,213 | 10/1973 | Nowicki | 73/45.3 |
| 3,805,593 | 4/1974 | Sandoz et al. | 73/49.2 |
| 3,824,840 | 7/1974 | Amberg | 73/45.3 |
| 3,827,284 | 8/1974 | Armstrong et al. | 73/45.1 |
| 3,869,042 | 3/1975 | Floyd et al. | 198/267 |
| 4,107,977 | 8/1978 | Grinberg et al. | 73/45.3 |
| 4,118,972 | 10/1978 | Geoppner et al. | 73/40 |
| 4,349,400 | 9/1982 | Gilden | 156/217 |
| 4,409,045 | 10/1983 | Busse | 156/69 |
| 4,680,016 | 7/1987 | Lynch | 493/159 |
| 4,683,745 | 8/1987 | Broughman, Jr. et al. | 73/49.2 |
| 4,708,014 | 11/1987 | Janitz | 73/37 |
| 5,029,749 | 7/1991 | Aloisi | 229/1.5 |
| 5,052,577 | 10/1991 | Cuns-Rial et al. | 220/310 |
| 5,205,157 | 4/1993 | McDaniel | 73/49.2 |
| 5,273,167 | 12/1993 | Haas et al. | 209/591 |
| 5,324,249 | 6/1994 | Konzal | 493/109 |
| 5,431,619 | 7/1995 | Bacon et al. | 493/158 |

Primary Examiner—Hezron E. Williams
Assistant Examiner—Jay L. Politzer
Attorney, Agent, or Firm—Nixon & Vanderhye

[57] ABSTRACT

The testing of containers for leaks is accomplished solely by means of volumetric compression of air trapped within the container interior during a stroke of a top cuff forming mandrel. Upon sensing the presence of a defective container, a container transfer chute is activated so as to remove the defective container from the container-making machinery and thereby separate it from those containers determined to be acceptable. In the event that a number of containers per predetermined unit time period (e.g., at least 10 containers per minute) have been determined to be defective, a controller will initiate a machine self-diagnostic mode. Once a first threshold number of defective containers per unit time is sensed, then a complete machine shut-down will occur if a second threshold number of defective containers is sensed in the next subsequent unit time period (e.g., greater that 10 containers during the next successive minute of operation). If, however, no containers are determined to be defective during a subsequent unit time period, then a counter associated with the controller will be reset. That is, no defective containers during a subsequent unit time period is indicative that the defective containers were simply a transient problem not associated with any inherent on-going problem associated with the container-making machine. As a result, the controller allows the container-making machine to continue to operate.

24 Claims, 5 Drawing Sheets

APPARATUS AND METHOD FOR TESTING CONTAINERS

This is a continuation of application Ser. No. 08/309,588, filed Sep. 21, 1994, now abandoned.

FIELD OF INVENTION

This invention is related to the field of container testing apparatus and methods. In preferred forms, the present invention is embodied in apparatus and methods by which defective containers (e.g., paperboard containers) are tested in-line as component part of the container manufacturing process with defective containers being separated automatically from those determined to be acceptable.

BACKGROUND AND SUMMARY OF THE INVENTION

Containers used for liquid or solid foodstuffs (e.g., drinking cups, containers for frozen confections and the like) are required to be substantially leak-proof so that the filled containers may be handled reliably during shipping and/or consumer usage with minimal risk of the contents leaking and thereby creating an inconvenient mess. In this regard, containers made from paperboard sheet stock material having a bottom wall glued or otherwise attached to a generally cylindrical side wall are susceptible to leakage at the circumferential seam between the bottom and side walls as well as the longitudinal seam of the side wall (i.e., where the ends of the side wall sheet are attached to one another).

Typically, therefore, paperboard container manufacturers will spot-check containers for leakage by subjecting a number of containers representing a sample of containers made during a given manufacturing run to manual leak-tests. That is, a representative number of containers for a given manufacturing run will be filled with a dyed liquid and allowed to stand for a period of time so that any leaks may be readily determined visually by the leak-test operator. If several containers from the representative sample are identified as "leakers", the cause of such defective containers is then investigated by down-time inspection of the machine which was responsible for the container manufacture. During the time that leakage problems are detected, a substantial number of potentially defective containers could be manufactured due to the high-speed operation of the container manufacturing machine thereby potentially requiring the container manufacturer to scrap an entire run of containers during that time period. Since the manufacturer cannot guarantee that all containers made during that time period are defective, there is a real risk that acceptable containers are scrapped along with any defective containers that may have been made. Clearly, such a procedure amounts to potential significant waste of resources and decreased productivity.

It has been proposed in U.S. Pat. No. 3,307,390 to Behrens et al (the entire content of which is expressly incorporated hereinto by reference) to perform leak testing of containers automatically during formation of the container's top curl. Specifically, Behrens et al disclose an apparatus whereby a separate locking member is provided as a lower component part of the curling head and is spring-biased so that the upper portion of the container side wall is compressed between the outer circumferential surface of the locking member and the upper portion of the container holder cavity. As such, the container is held in the holder cavity. (Column 4, lines 27–40.)

While the apparatus disclosed in the Behrens et al '390 patent does provide an alternative to the conventional technique of manually testing representative samples of containers for leakage, it does have some disadvantages. For example, the separate locking member which is a critical component of the structures disclosed in the Behrens et al '390 patent must be provided with a conformably sized and configured container holder. As such, the apparatus disclosed in the Behrens et al '390 patent does not lend itself to being readily retrofitted on existing container-making machinery.

It would therefore be desirable if an in-line automatic container leak testing apparatus and method were provided which could easily be retrofitted onto existing container-making machinery. It is toward fulfilling such a need that the present invention is directed.

Broadly, the present invention is embodied in a container leak-testing apparatus and method whereby the top curl forming mandrel associated with conventional container-making machinery is minimally modified so as to include a sensing port which establishes fluid-communication between the container interior and a remote pressure switch. According to the present invention, therefore, the top curl forming mandrel will capture a volume of air at the moment the top curl forming mandrel comes into contact with the top end of the container side wall. This trapped volume of air will therefore be substantially at ambient pressure. However, during the downstroke of the top curl forming mandrel into its final position, the trapped volume of air within the interior of the container will be compressed slightly in the absence of leaks. This slight increase in pressure is thereby sensed by the pressure sensor as an indication of an acceptable container.

On the other hand, if a leak is present, the downstroke of the top curl forming mandrel will not cause the ambient pressure condition within the container to increase (i.e., since the leak provide fluid-communication between the container interior and the ambient atmosphere). This lack of increased pressure condition within the container interior will likewise be sensed by the pressure sensor as an indication of a defective container.

Significantly, the testing of containers for leaks is accomplished solely by means of the volumetric compression of air trapped within the container interior during the downstroke of the top curl forming mandrel. In other words, unlike the apparatus disclosed in Behrens et al '390, no pressurizing fluid is admitted forcibly into the interior of the container during leak testing.

Upon sensing the presence of a defective container, the apparatus of this invention will activate a container transfer chute so as to remove the defective container from the container-making machinery and thereby separate it from those containers determined to be acceptable. In the event that a number of containers per predetermined unit time (e.g., at least 10 containers per minute) has been determined to be defective, the apparatus of this invention will then be placed in a self-diagnostic mode. That is, if a threshold number of defective containers per unit time is sensed, then the apparatus of this invention is capable of executing a complete machine shut-down in the event that a further predetermined number of defective containers is sensed during a subsequent unit time period (e.g., greater that 10 containers during the next successive minute of operation). If, however, no containers are determined to be defective during the next subsequent unit time period, then the controller associated with the apparatus of this invention will be reset. That is, no subsequent defective containers during a subsequent unit time period is indicative that the defective containers were simply a transient problem not associated with any inherent on-going problem associated with the container-making machine. As a result, the container-making machine is allowed to continue operation.

Further aspects and advantages of this invention will become more clear after careful consideration is given to the detailed description of the preferred exemplary embodiments thereof which follow.

BRIEF DESCRIPTION OF THE DRAWINGS

Reference will hereinafter be made to the accompanying drawings wherein like reference numerals throughout the various FIGURES denote like structural elements, and wherein.

DETAILED DESCRIPTION OF THE PREFERRED

EXEMPLARY EMBODIMENTS

Figure 1:
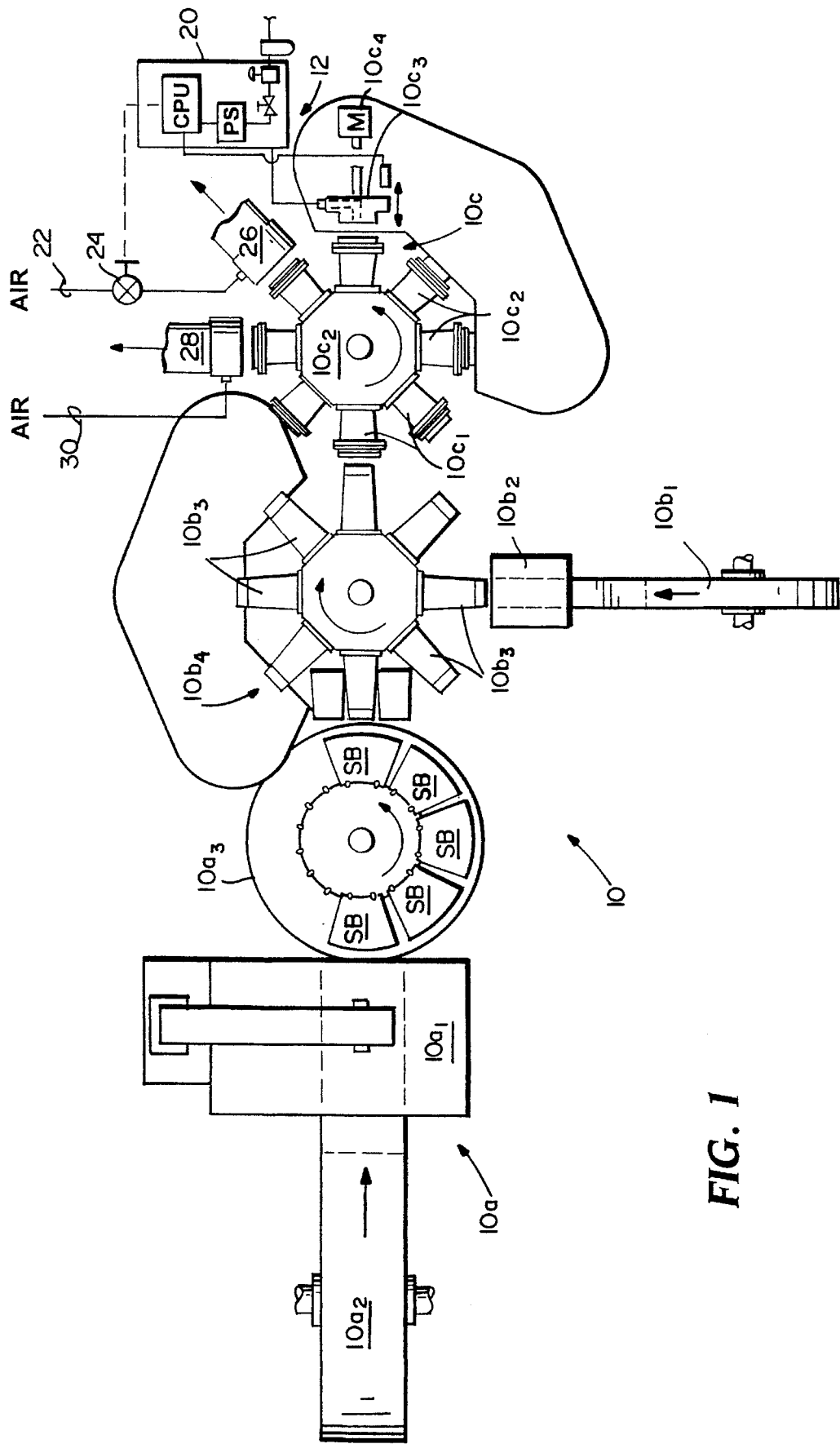
FIG. 1 is a schematic top plan view of a container-making machine which includes a container leak testing system according to the present invention.

Accompanying FIG. 1 depicts in schematic fashion a container-making machine 10 for making containers from paperboard sheet stock that employs a container-testing assembly 12 for leak testing containers, according to the present invention. In this regard, the container making machine 10 which is suitable for use in conjunction with the leak testing system is in and of itself conventional in that it includes a side wall blank-forming station 10a, a side and bottom wall forming station 10b, and a top curl forming station 10c.

The side wall blank-forming station 10c is provided with a blank-forming press $10a_1$ which punches arcuate shaped side wall blanks SB from a roll $10a_2$ of paperboard sheet stock. The side wall blanks SB are picked-up by a transfer turn-table $10a_3$ which transfers the side wall blanks SB to the side and bottom wall forming station 10b. The bottom walls of the containers are punched from a roll of sheet paperboard sheet stock $10b_1$ by means of bottom wall punch $10b_2$ and are transferred to the bottom of the container-forming mandrels (a few of which are identified by reference numeral $10b_3$) radially extending from the turn-table $10b_4$. The container-forming mandrels $10b_3$ will thereafter pick up one of the side wall blanks SB in sequence so that the side wall blanks SB are folded around the mandrel $10b_3$. During this operation, the side seam and the circumferential bottom wall seam are glued to thereby create container preforms (i.e., containers which are complete except for the formation of the top curl around the container's upper edge).

Continued indexing of the turn-table $10b_4$ will thereby present each of the container preforms to individual holders $10c_1$ radially associated with a transfer table $10c_2$. The transfer table $10c_2$ thereby sequentially transfers the container preforms to the top curl forming station 10c where the top curl forming mandrel $10c_3$ reciprocally moves into registry with the top edge of the container preform by means of motor (M) $10c_4$. During the "down-stroke" of the top curl forming mandrel $10c_1$ (i.e., during movement of the top curl forming mandrel $10c_3$ in a direction toward the holder $10c_1$).

Figure 2A:
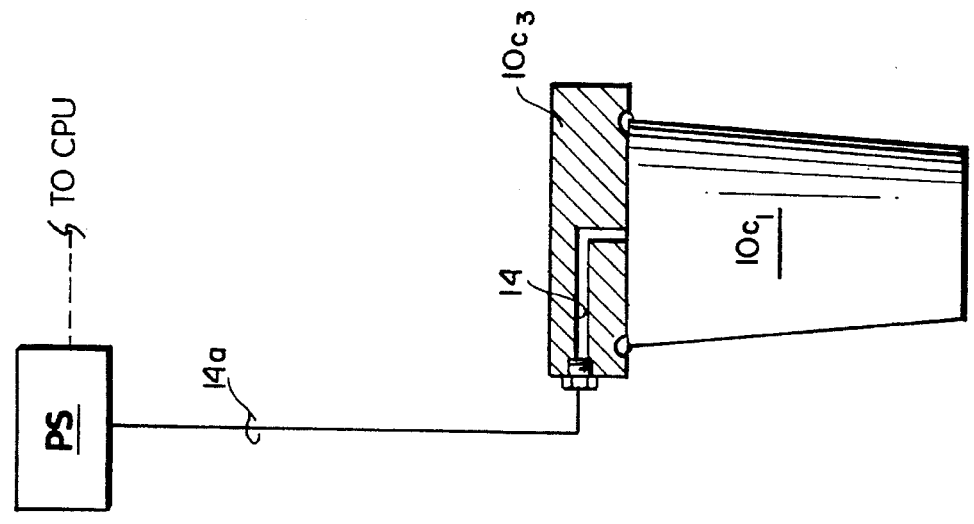
FIGS. 2a–2c are schematic sequence diagrams showing the top curl forming mandrel during a downstroke when forming the top curl of a container.
Figure 2B:
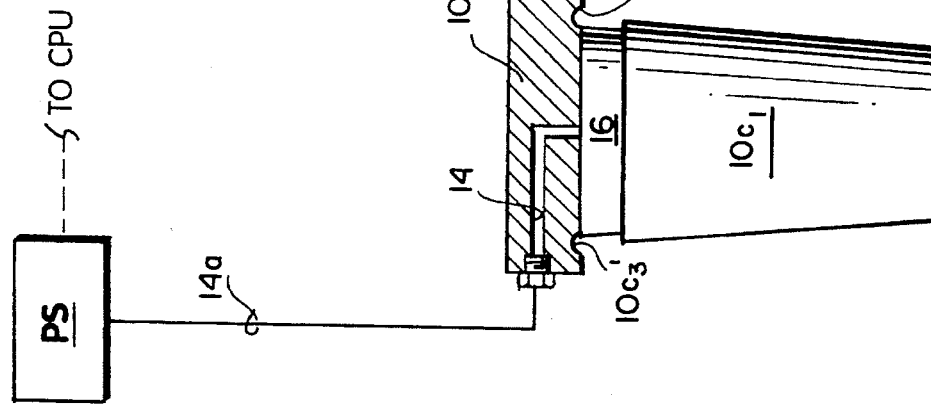
Figure 2C:
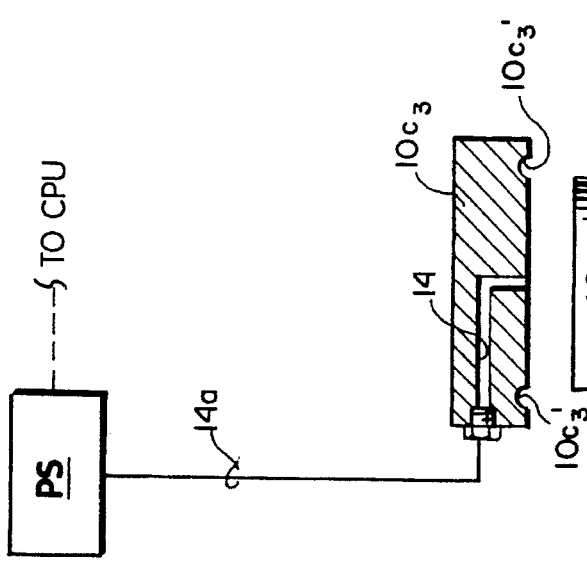

As is more clearly depicted in accompanying FIGS. 2a–2c, the top curl forming mandrel $10c_3$ is provided with an internal conduit 14 which is fluid-connected to pressure switch PS via pneumatic line 14a. An upper region 16 of the container extends beyond the uppermost edge of the holder $10c_1$. Usually, the upper region 16 extends between about 0.10 to 0.40 inch, and more typically between about 0.16 to about 0.35 inch, beyond the uppermost edge of the holder $10c_1$. As a result, when the top curl forming mandrel $10c_3$ approaches the upper region 16 of the container, the top curl-forming surfaces $10c_3'$ will come into contact with the upper region 16 and thereby trap a volume of air at ambient pressure within the container. That is, the top curl-forming surfaces $10c_3'$ will form a seal with the upper edge of the region 16 when the former contacts the latter as shown in FIG. 2c.

Continued movement of the top curl forming mandrel $10c_3$ will thereby roll the upper portion 16 of the container outwardly thereby forming the top curl of the container as shown in FIG. 2c. At the same time, however, this final stroke of the top cuff forming mandrel $10c_3$ will compress somewhat the air trapped within the container—i.e., due to the continued movement of the mandrel $10c_3$ toward the holder $10c_1$ by a linear dimension corresponding to the dimension by which the upper portion extends beyond the uppermost edge of the holder $10c_1$. In the absence of container leakage, therefore, this increased pressure condition is sensed by the pressure switch PS (i.e., due to the fluid-communication established by internal conduit 14 and pneumatic line 14a) contained within housing 20 located near the top curl forming station 10c (see FIG. 1). If, on the other hand, the container leaks, the ambient pressure condition will remain within the interior of the container which is sensed by the pressure switch PS.

In FIG. 1 outputs from the pressure switch PS are directed to the CPU (or controller) contained within the housing 20. If a container is determined to contain a leak, the CPU will therefore output a signal to solenoid control valve 22 located in pressurized air line 24. When the holder $10c_1$ containing the defective container is brought into registry with the reject chute 26 (reject station), therefore, the air flowing thereinto from line 24 will remove the container from its associated holder $10c_1$ and cause it to be transferred to a remote scrap location. If, on the other hand, no leaks are detected within the container, the CPU will not issue a command signal to the solenoid valve 24 so that the container can be indexed into registry with the accepts chute 28 continuously supplied with pressurized air via line 30. As such, those containers determined to be acceptable due to the absence detected leaks may be segregated from those determined to be unacceptable due to the presence of detected leaks.

Figure 3:
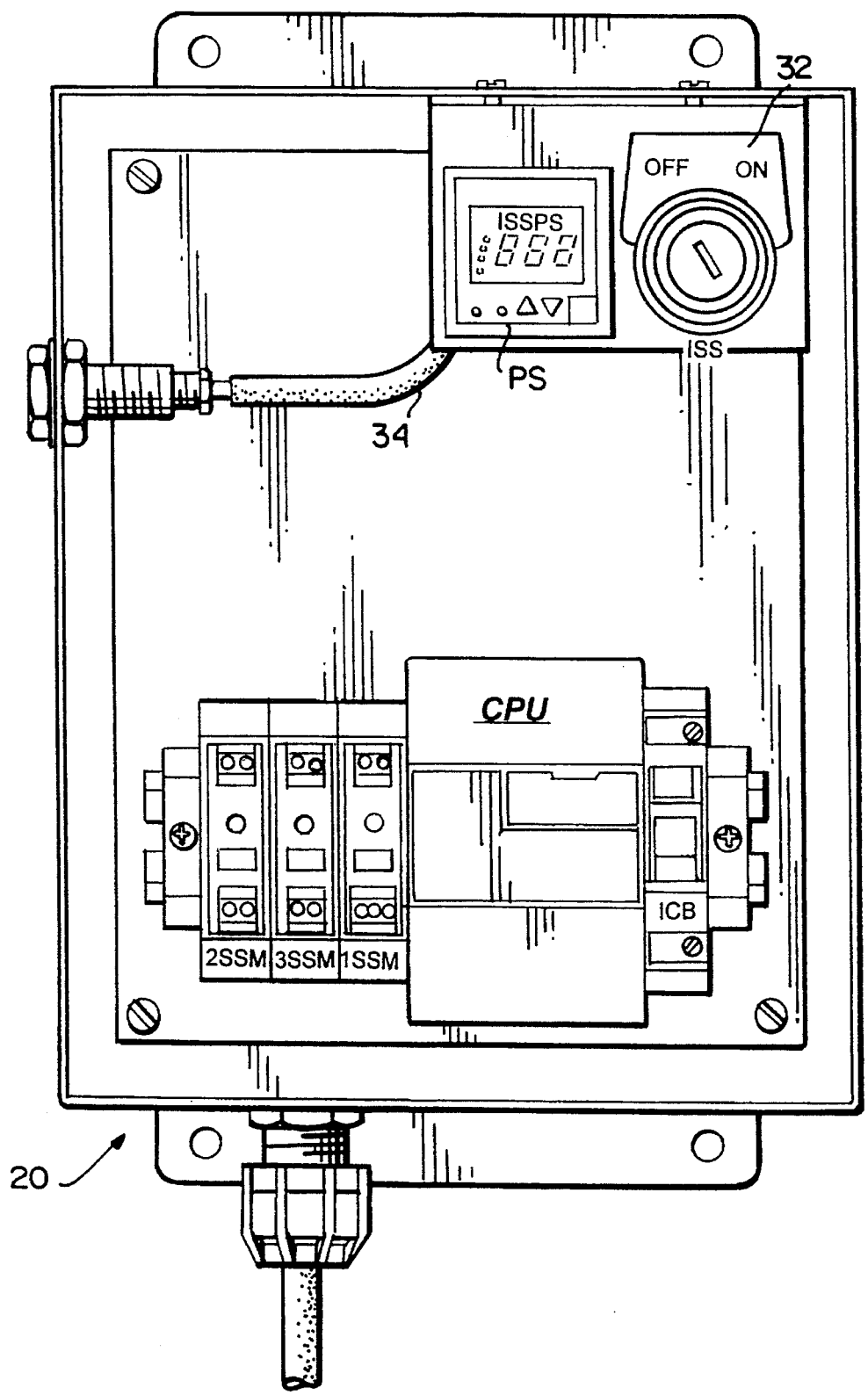
FIG. 3 is an elevational view of the components employed in the control system used in the present invention.

The individual components within the housing 20 are depicted in accompanying FIG. 3. In this regard, the housing 20 contains the pressure switch PS and an on-off switch 32 and a reset switch 1PB/LT. The pressure switch PS is a solid state, digital pressure switch. The preferred pressure switch PS is model KV-10T from Keyence Co. As will be explained in greater detail below, if the pressure switch does not trip (i.e., if an increased pressure over the set point pressure is not developed within the container during formation of the top curl by the top curl forming mandrel 10c₃), no output will be generated thereby starting the reject process. The pressure switch PS is connected to line 14a via flexible coupling hose 34.

The housing 20 also contains the CPU and its associated relays 1SSM-3SSm and power breaker switch ICB. The CPU is most preferably a model No. KV-U2 (0.8 amp) programmable logic controller commercially available from Keyence Co. As will be explained in greater detail below, the CPU will perform the following basic functions based on received inputs: (i) determine if the container is acceptable or defective based on the input signal generated by the pressure switch PS; (ii) shift the reject signal to selected stations on the machine by means of a shift register; (iii) energize the solenoid valve 24 at the reject chute 26 so as to expel a defective container; and (iv) illuminate a green lamp for every acceptable container detected and a red lamp for every rejected (defective) container. In addition, the CPU may be used to record in memory data that can be displayed on command at a remote terminal such as, the total number of containers rejected, the total number of containers manufactured, the total number of machine (top curl forming mandrel) strokes and/or the charge time or the time required by the container to reach its internal pressure condition (i.e., so as to determine system sensitivity).

Figure 4:
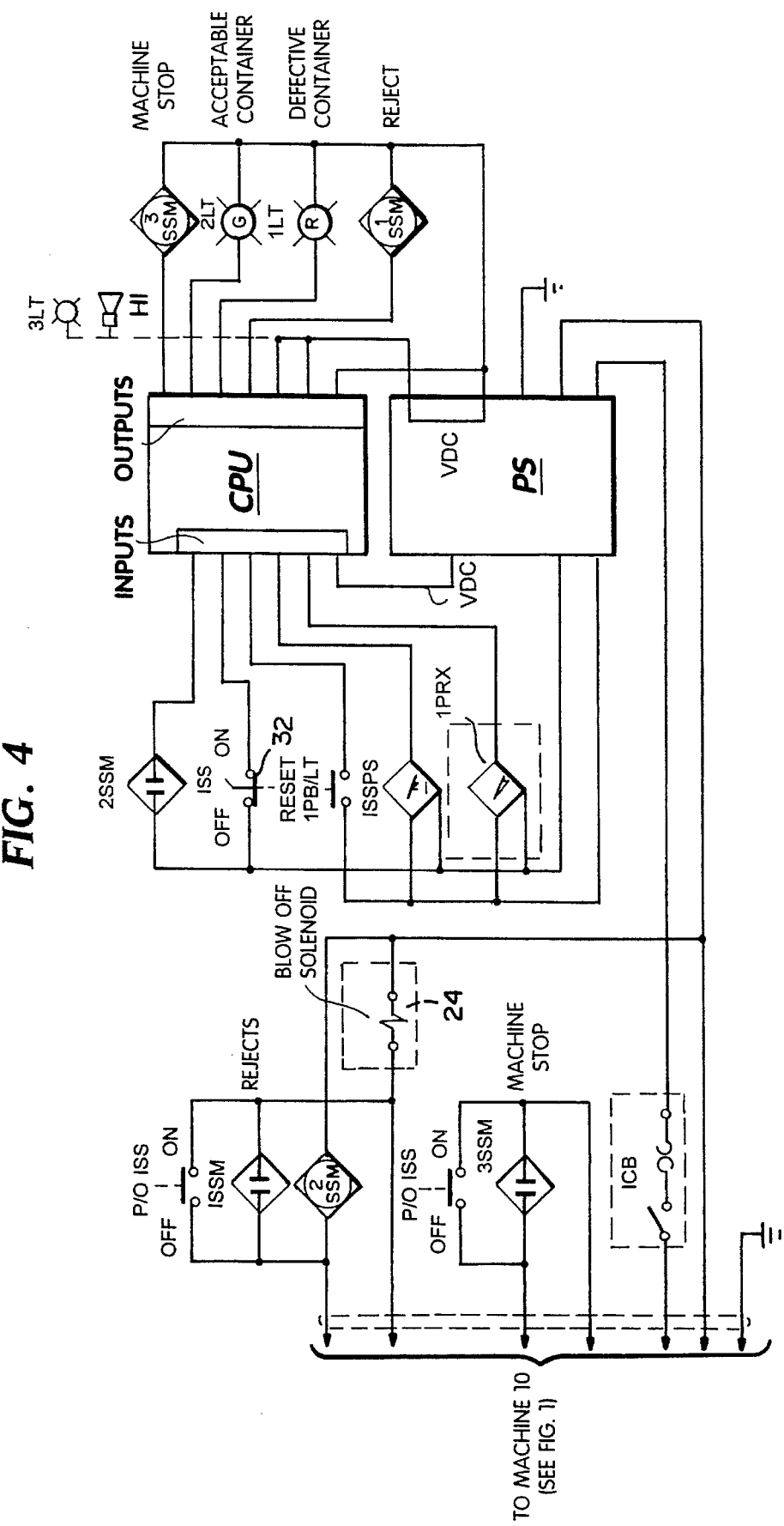
FIG. 4 is a schematic wiring diagram of the control system used in the present invention.

Accompanying FIG. 4 shows the preferred manner in which the components within the housing 20 are operatively interconnected. In this regard, it will be observed that the pressure switch 1SSPS will close in response to the pressure condition within the container exceeding a preset value (which value may be preset via the manual controls associated with the display portion of the pressure switch PS (see FIG. 3). At the same time, the switch 1PRX associated with the proximity sensor 40 (see FIG. 1) will latch closed until the top curl forming mandrel 10c₃ begins its next subsequent cycle. At this time, the CPU determines that an "acceptable" container is present and issues a signal to illuminated the green lamp 2LT. At this time also, the CPU may update data in its memory so that the total number of acceptable containers produced may be monitored.

In the event that the container has a leak, however, the switch 1SSPS will not be closed while the switch 1PRX will be closed. This condition is inputted to the CPU which increments an internal counter dependent upon machine cycles. When the internal counter has reached a value which is indicative that the defective cup has been moved into registry with the reject chute 26, the CPU will issue a reject signal to relay 1SSM which closes contact 1SSM and thereby activates the blow-off solenoid 24 when the control switch P/O 1SS is in the "auto" mode. At the same time, the CPU issues a signal to illuminate red lamp 1LT thereby providing a visual indication to the machine operator that a defective cup has been detected. Upon the closure of contact 1SSM, the relay 2SSM will be energized thereby closing contact 2SSM and providing the CPU with an input which clears its internal shift register.

Figure 5:
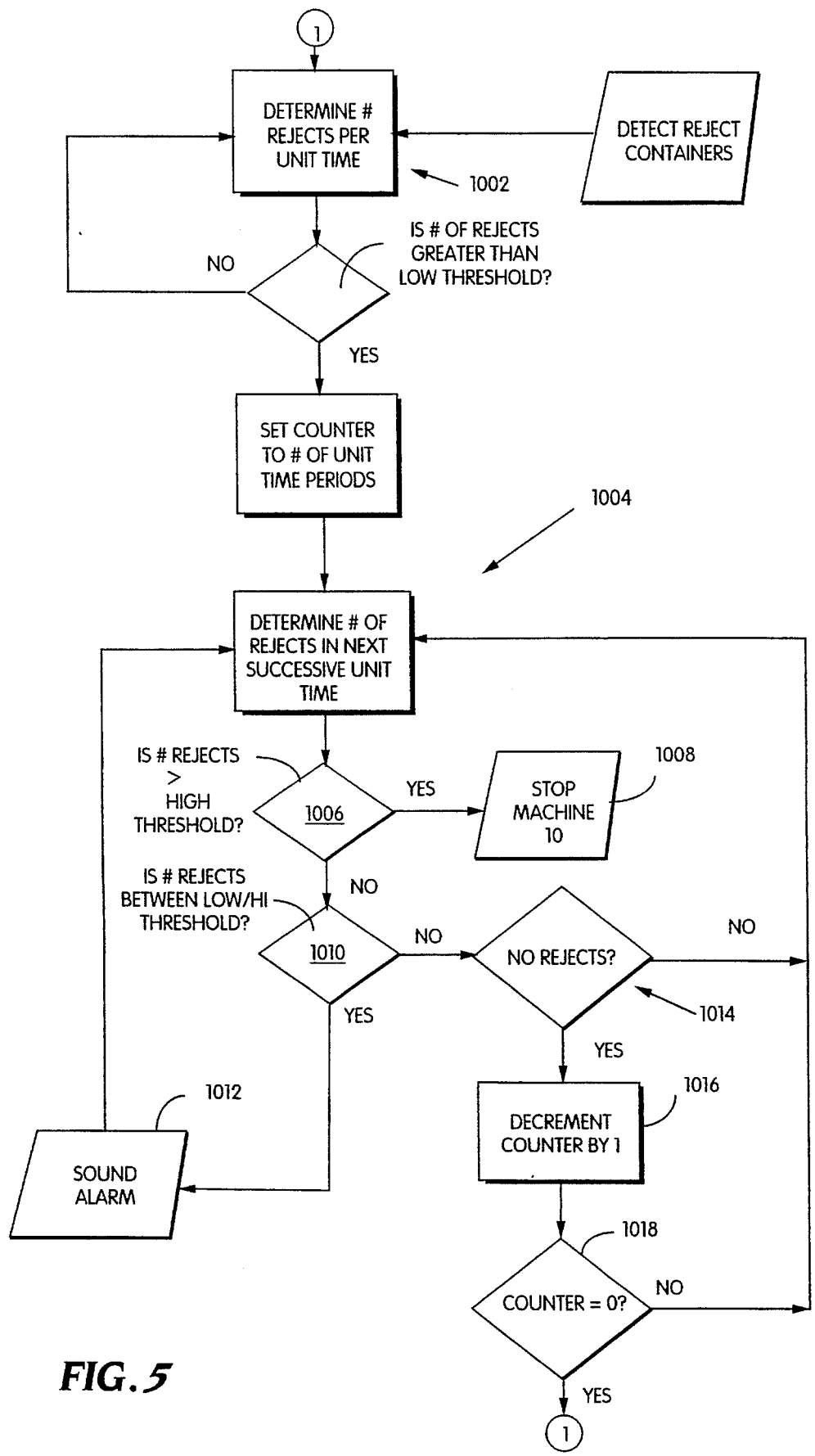
FIG. 5 is a logic flow diagram that is employed in the controller's CPU so as to perform self-diagnostic functions.

As briefly noted above and shown in FIG. 5, the CPU is also preferably programmed so that it is capable of performing diagnostic functions. That is, in the event that a low threshold number of containers per predetermined unit time (e.g., at least 10 containers per minute) have been determined to be defective (Step 1002), the CPU will then be placed in a diagnostic mode whereby it examines the number of defective cups in the next successive unit time periods (Step 1004). If within the next successive unit time period the number of defective containers exceeds a predetermined high threshold number, for example, 18 defective containers within the next successive minute, then (Step 1006) the CPU issues a command signal to relay 3SSM which opens the latch contact 3SSM and thereby stops the entire machine 10 (Step 1008), until a reset switch P/O ISS is activated. If, on the other hand, less than the high threshold number of defective containers are detected during the next successive unit time period, the CPU will in step 1010 issue an output signal to initiate an audible/visual alarm via horn H1 and lamp 3LT (Step 1012).

In the event that no defective containers are detected after the diagnostic mode has been entered (Step 1014), the counter will automatically decrement by one Thus, if no defective containers are detected when the low threshold number is set to 10 containers per minute, the counter will decrement (Step 1016) until reaching zero (Step 1018) thereby indicating proper machine functioning and return to step 1002. As shown in step 1016, until the counter reaches zero, the diagnostic mode continues (see step 1004) until the internal counter of rejects is decremented to zero or the machine is stopped (step 1008) because of an excessive number of container rejects. In the self-diagnostic protocol described above, any number of defective containers detected per unit time which is less than the preset low threshold number are considered to be machine anomalies and thus not indicative of any potential problems associated with the container-forming machine 10. The self-diagnostic functions described above are depicted in the logic flow diagram of accompanying FIG. 5.

It should now be apparent that the leak testing system according to the present invention provides several advantages in terms of data collection, self-diagnostics and the like. However, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of on-line monitoring of a container-manufacturing machine so as to determine machine malfunction based on numbers of rejected containers comprising the steps of:

(a) concurrently forming a top curl of a container and trapping ambient air in the container to establish a non-ambient pressure condition;

(b) monitoring said non-ambient pressure condition to identify containers to be rejected;

(c) determining the number of rejected containers during a first unit time period;

(d) initiating a diagnostic cycle if the number of rejected containers during said first unit time period is greater than a preselected low threshold value;

(e) determining the number of rejected containers during a second unit time period subsequent to said first unit time period and decrementing the threshold value by a preselected decremental value in the event that no rejected containers are determined during said subsequent second unit time period; and (f) repeating step (e) for additional unit time periods subsequent to said second unit time period until said threshold value has been decremented to zero.

2. A method of on-line monitoring of a container-manufacturing machine utilizing mandrel compressed ambient air to machine malfunction based on numbers of rejected containers comprising e steps of:

(a) determining the number of rejected containers during a unit time period;

(b) initiating a diagnostic cycle if the number of rejected containers during said first unit time period is greater than a preselected low threshold value;

(c) determining the number of rejected containers during a second unit time period subsequent to said first unit time period and decrementing the threshold value by a preselected decremental value in the event that no rejected containers are determined during said subsequent second unit time period, and stopping the container-manufacturing machine in the event that the number of rejected containers determined during said second unit time period exceeds a preset high threshold value which is greater than said low threshold value; and (d) repeating step (c) for additional unit time periods subsequent to said second unit time period until said threshold value has been decremented to zero.

3. The method as in claim 2, wherein step (c) includes the step of initiating an alarm in the event that the number of rejected containers during said second time period is between said predetermined low and high threshold values.

4. The method as in any one of claims 1–3, wherein step (a) includes the steps of sequentially testing containers made by said container-manufacturing machine for leakage, and identifying those containers which leak as rejected containers.

5. The method as in claim 4, wherein said step of testing containers includes the steps of establishing a non-ambient pressure condition within said containers, and determining rejected containers by the absence of said pressure condition therewithin.

6. The method as in claim 5, wherein said step of establishing a non-ambient pressure condition within said containers includes trapping air within container interiors just prior to formation of top curls at the upper circumferential edges of the containers, and the forming the top curls while simultaneously compressing said trapped air within the containers.

7. The method as in claim 1, wherein said second unit time period successively follows said first unit time period.

8. The method as in claim 1 or 7, wherein said additional unit time periods successively follow one another.

9. The method as in claim 1, wherein step (b) includes the step of setting a counter with said low threshold value, and wherein each of steps (b) and (c) includes the step of decrementing the counter by 1 in the event that no rejected containers are respectively determined during said second and additional unit time periods.

10. A container-manufacturing mechanism determining malfunctions based on numbers of rejected containers, said mechanism comprising:

a curl forming mandrel moving into contact with the container to form a curl on a container and concurrently trap ambient air in the container to create a non-ambient air pressure condition;

a pressure sensor in fluid communication with the container to monitor the non-ambient air pressure condition and identify containers to be rejected;

a container-testing assembly for determining the number of rejected containers during a first unit time period;

a controller operatively connected to said container-testing assembly for (i) initiating a diagnostic cycle if the number of rejected containers per first unit timer period is greater than a preset low threshold value, (ii) determining the number of rejected containers per second unit time period subsequent to said first unit time period, and (iii) decrementing the low threshold value by a predetermined decremental value in the even that said container-testing assembly determines that no rejected containers are made during said second unit time period.

11. The mechanism as in claim 10, wherein said controller determines the number of rejected containers during additional unit time periods subsequent to said second unit time period and, in the event no rejected containers are detected during said additional unit time periods, responsively decrements said threshold value until said threshold value is zero.

12. Apparatus for the on-line monitoring of container-manufacturing apparatus to determine malfunctions based on numbers of rejected containers, said apparatus comprising:

a curl forming mandrel moving into contact with the container to form a curl on a container and concurrently trap ambient air in the container to create a non-ambient air pressure condition;

a pressure sensor in fluid communication with the container to monitor the non-ambient air pressure condition and identify containers to be rejected;

a container-testing assembly for determining the number of rejected containers during a first unit time period;

a controller operatively connected to said container-testing assembly for (i) initiating a diagnostic cycle if the number of rejected containers per first unit time period is greater than a preset low threshold value, (ii) determining the number of rejected containers per second unit time period subsequent to said first unit time period, wherein said controller issues a stop command to the container-manufacturing machine in the event that the number of rejected containers determined during said second unit time period exceeds a preset high threshold value which is greater than said low threshold value, and (iii) decrementing the low threshold value by a predetermined decremental value in the event that said container-testing assembly determines that no rejected containers are made during said second unit time period.

13. Apparatus for the on-line monitoring of container-manufacturing apparatus to determine malfunctions based on numbers of rejected containers, said apparatus comprising:

a curl forming mandrel moving into contact with the container to form a curl on a container and concurrently trap ambient air in the container to create a non-ambient air pressure condition;

a pressure sensor in fluid communication with the container to monitor the non-ambient air pressure condition and identify containers to be rejected;

a container-testing assembly for determining the number of rejected containers during a first unit time period;

a controller operatively connected to said container-testing assembly for (i) initiating a diagnostic cycle if the number of rejected containers per first unit time period is greater than a preset low threshold value, (ii) determining the number of rejected containers per second unit time period subsequent to said first unit time period, and (iii) decrementing the low threshold value by a predetermined decremental value in the event that said container-testing assembly determines that no rejected containers are made during said second unit time period, and an alarm, wherein said controller initiates said alarm in the event that the number of rejected containers during said second time period is between said low threshold value and a preset high threshold value.

14. The apparatus as in any one of claims 12 or 13, wherein said container-testing assembly includes a testing station which sequentially establishes a non-ambient pressure condition within containers presented to said testing station, and a pressure sensor which determines rejected containers by the absence of said nonambient pressure condition within said containers.

15. The apparatus as in claim 14, wherein said testing station includes a top curl forming mandrel for forming a top curl at upper circumferential edges of said containers, said top curl forming mandrel trapping air within container interiors just prior to formation of said top curl, and then compressing said trapped air within the container interiors simultaneously with formation of said top curl.

16. The apparatus as in claim 10, wherein said controller includes a counter which is set with said low threshold value, said counter being decremented by a decremental value of 1 in response to said container-testing assembly determining that no rejected containers are made during said second and additional unit time periods respectively.

17. Apparatus for leak testing of containers during automated container manufacture with a container-manufacturing machine which includes a top curl forming mandrel reciprocally movable towards and away from a circumferential top edge of the container and thereby form top curls thereat, said apparatus comprising:

a pressure sensor;

a pressure sensing line establishing fluid communication between said pressure sensor and an interior of said container through said top curl forming mandrel;

means for moving said top curl forming mandrel during a top curl forming stroke such that said top curl forming mandrel initially contacts said circumferential top edge of the container during initial travel of said top curl forming mandrel so as to trap a volume of ambient air within said container, and then forms said top curl during subsequent travel of said top curl forming stroke to a final position, wherein said top curl forming mandrel compresses said trapped volume of ambient air during said top curl forming stroke to said final position so as to create a non-ambient pressure condition within said container, and wherein said pressure sensor senses whether said non-ambient pressure condition is created within said container, and in response to sensing presence or absence of said nonambient pressure condition within said container generates signals indicative of whether the container does not leak and is thereby acceptable, or leaks and is thereby rejected.

18. The apparatus as in claim 17, further comprising:

a controller operatively connected to said pressure sensor, said controller receiving said signals from the pressure sensor indicative of accepted and rejected containers, respectively;

a normally inoperative reject station which, when placed in an operative mode, removes rejected containers from said container-manufacturing machine, wherein said controller, in response to said pressure sensor determining the presence of a rejected container, issues a reject signal to said reject station when said rejected container is conveyed into a position within said reject station so that said rejected container is removed from said container-manufacturing machine.

19. The apparatus as in claim 18, wherein said controller includes a counter which counts the number of rejected containers during a first unit time period, and initiates a self-diagnostic cycle if the number of rejected container per first unit time period is greater than a preset low threshold value.

20. Apparatus for leak testing of containers during automated container manufacture with a container-manufacturing machine which includes a top curl forming mandrel reciprocally movable towards and away from a circumferential top edge of the container and there by form top curls thereat, said apparatus comprising:

a pressure sensor;

a pressure sensing line establishing fluid communication between said pressure sensor and an interior of said container through said top curl forming mandrel;

means for moving said top curl forming mandrel during a top curl forming stroke such that said top curl forming mandrel initially contacts said circumferential top edge of the container during initial travel of said top curl forming mandrel so as to trap a volume of ambient air within said container, and then forms said top curl during subsequent travel of said top curl forming stroke to a final position, wherein said top curl forming mandrel compresses said trapped volume of ambient air during said top curl forming stroke to said final position so as to create a non-ambient pressure condition within said container, and wherein said pressure sensor senses whether said non-ambient pressure condition is created within said container, and in response to sensing presence or absence of said non-ambient pressure condition within said container generates signals indicative of whether the container does not leak and is thereby acceptable, or leaks and is thereby rejected;

a controller operatively connected to said pressure sensor, said controller receiving accept and reject signals from said pressure controller indicative of accepted and rejected containers, respectively, said controller includes a counter which counts the number of rejected containers during a first unit time period, and initiates a diagnostic cycle if the number of rejected container per first unit time period is greater than a preset low threshold value;

a normally inoperative reject station which, when placed in an operative mode, removes rejected containers from said container-manufacturing machine; wherein said controller, in response to said pressure sensor determining the presence of a rejected container, issues a reject signal to said reject station when said rejected container is conveyed into a position within said reject station so that said rejected container is removed from said container-manufacturing machine;

wherein said controller determines the number of rejected containers during a second unit time period subsequent to said first unit time period, and decrements said counter by a preselected decremental value in the event that no rejected containers are determined during said second unit time period.

21. The apparatus as in claim 20, wherein said controller issues a stop command to the container-manufacturing machine in the event that the number of rejected containers determined during said second unit time period exceeds a preset high threshold value which is greater than said low threshold value.

22. The apparatus as in claim 20, further comprising an alarm, and wherein said controller initiates said alarm in the event that the number of rejected containers during said second time period is between said low threshold value and a preset high threshold value.

23. The method as in claim 1, wherein step (a) includes the steps of sequentially testing containers made by said container-manufacturing machine for leakage, and identifying those containers which leak as rejected containers.

24. The apparatus as in claims 10 or 11, wherein said container-testing assembly includes a testing station which sequentially establishes a non-ambient pressure condition within containers presented to said testing station, and a pressure sensor which determines rejected containers by the absence of said non-ambient pressure condition within said containers.

* * * * *